(12) United States Patent
Katayama

(10) Patent No.: US 6,366,234 B1
(45) Date of Patent: Apr. 2, 2002

(54) VEHICULAR RADAR

(75) Inventor: Koji Katayama, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/438,943

(22) Filed: Nov. 12, 1999

(30) Foreign Application Priority Data

Jun. 4, 1999 (JP) ............................................ 11-158140

(51) Int. Cl.[7] .............................................. G01S 13/93
(52) U.S. Cl. ............................. 342/70; 342/71; 342/72; 342/75
(58) Field of Search ............................. 342/70, 71, 72, 342/74, 75, 368, 370

(56) References Cited

U.S. PATENT DOCUMENTS

| | | | | |
|---|---|---|---|---|
| 5,714,947 A | * | 2/1998 | Richardson et al. | ......... 340/903 |
| 5,767,793 A | * | 6/1998 | Agraante et al. | ............ 340/903 |
| 5,825,333 A | * | 10/1998 | Kudoh et al. | ............ 343/781 R |
| 6,034,642 A | * | 3/2000 | Kojima et al. | ............... 343/753 |
| 6,204,803 B1 | * | 3/2001 | Uehara | ......................... 342/70 |

FOREIGN PATENT DOCUMENTS

| | | | |
|---|---|---|---|
| DE | 197 49 752 | 7/1998 | |
| EP | 0 840 140 | 5/1998 | |
| JP | 2689453 | 8/1997 | ............ H01Q/3/30 |
| JP | 2727830 | 12/1997 | ............ H01Q/3/01 |
| JP | 11-072554 | 3/1999 | |

OTHER PUBLICATIONS

German Official Action dated Jun. 22, 2001.

* cited by examiner

*Primary Examiner*—John B. Sotomayor
(74) *Attorney, Agent, or Firm*—Sughrue, Mion, Zinn, Macpeak & Seas, PLLC

(57) ABSTRACT

A vehicular radar includes a transmitter for outputting a transmitted electromagnetic wave; an antenna unit for radiating the transmitted electromagnetic wave and receiving a electromagnetic wave reflected by an object to be detected as a received electromagnetic wave; a receiver for detecting the reflected electromagnetic wave received by the antenna unit; and a signal processor for processing an output signal from the receiver to output information about the object. The antenna unit includes a single electromagnetic radiator for radiating the transmitted electromagnetic wave, a single reflector for reflecting the transmitted electromagnetic wave from the electromagnetic radiator and radiating the transmitted electromagnetic wave as a beam, and a reflector swinging device for swinging the reflector so as to successively change a direction of the beam. The reflector swinging device includes a first arm, a second arm, a swinging pivot, a cam and a cam follower.

6 Claims, 2 Drawing Sheets

VEHICULAR RADAR

BACKGROUND OF THE INVENTION

1. Field of the Invention

The present invention relates to a vehicular radar, in particular a vehicular radar with a reflector, which is mounted on a vehicle, such as an automobile, to measure, e.g., the distance between a driving vehicle and an object.

2. Discussion of Background

In FIG. 3 is shown a schematic view to explain an antenna unit employed in a conventional vehicular radar, which is mounted on a vehicle, such as an automobile.

As schematically shown in FIG. 3, the conventional antenna unit includes a plurality of electromagnetic radiators 8a, which are provided at suitable positions with respect to a lens 21 so as to have a certain beamwidth and a certain beam spacing. The electromagnetic radiators are sequentially switched to change a beam radiating direction to successively measure a certain range, detecting an object in front of the vehicle.

There is an antenna unit that includes many antenna wherein the transmitting phase and the transmitting output of the respective antennas are controlled to change a beam radiating direction as a whole so as to scan a certain range, detecting an object in front of the vehicle.

Since the conventional vehicular radars carry out control by sequentially switching the plural electromagnetic radiators, the conventional vehicular radars have created a problem in that a great decrease in output is caused at a switching controller to degrade efficiency.

A radiant beam is required to be narrowed in order to radiate the electromagnetic wave to a lens in effective fashion. Narrowing the radiant beam requires that the electromagnetic radiators be enlarged. When the plural electromagnetic radiators are provided, the beam spacing can not be set to not greater than a certain value since the spacing between adjoining electromagnetic radiators is expanded. When electromagnetic radiators are provided at narrow intervals in order to obtain a certain beam spacing, the electromagnetic radiators are required to be small, resulting in expansion in the radiant beam radiated from each of the electromagnetic radiators. This means that the number of the radiant beams that pass outside the lens increases and that the number of the radiant beams that pass through the lens decreases, creating a problem in that the efficiency degrades.

SUMMARY OF THE INVENTION

It is an object of the present invention to solve these problems, and to provide a vehicular radar including an antenna unit comprising a single electromagnetic radiator for radiating a transmitted electromagnetic wave, a single reflector for reflecting the transmitted electromagnetic wave from the electromagnetic radiator and radiating the transmitted electromagnetic wave as a beam and a reflector swinging device for swinging the reflector so as to have successively change a direction of the electromagnetic wave beam, thereby easily setting the beamwidth and the beam spacing of the radiated beam at certain values and radiating the radiated beam in a certain direction with a high efficiency and at stable fashion.

The present invention provides a vehicular radar comprising a transmitter for outputting a transmitted electromagnetic wave, an antenna unit for radiating the transmitted electromagnetic wave and receiving a electromagnetic wave reflected by an object to be detected as a received electromagnetic wave, a receiver for detecting the reflected electromagnetic wave received by the antenna unit, and a signal processor for processing an output signal from the receiver to output information about the object, wherein the antenna unit comprises a single electromagnetic radiator for radiating the transmitted electromagnetic wave, a single reflector for reflecting the transmitted electromagnetic wave from the electromagnetic radiator and radiating the transmitted electromagnetic wave as a beam, and a reflector swinging device for swinging the reflector so as to successively change a direction of the beam.

The electromagnetic radiator may be fixed at a certain location, and the reflector swinging device may swing the reflector so as to have a focus of the reflector located at the certain location.

The reflector swinging device may support the reflector so as to have a focus of the reflector located on a swinging axis of the reflector swinging device. In addition, the reflector swinging device may comprise a reflector supporting arm with a cam follower provided on an imaginary line crossing the swinging axis, and a cam engaged with the cam follower to swing the reflector supporting arm in a certain angular range. The electromagnetic radiator may be fixed on the swinging axis.

The vehicular radar may further comprise an urging member having an end fixed to a stationary portion and the other end fixed to the reflector supporting arm to press the cam follower against the cam.

The urging member may comprise a coiled spring.

The reflector may be a molded product made of a plastic material and having a metallic film provided thereon.

The electromagnetic radiator may be an injection-molded product made of a magnesium alloy.

As explained, the present invention can radiate the transmitted electromagnetic wave to the reflector with When the electromagnetic radiator is fixed at a certain location, and when the reflector swinging device swings the reflector so as to have the focus of the reflector located at the certain location, the beam radiated from the electromagnetic radiator and reflected by the reflector can be radiated at a certain beam spacing and with a stable strength.

When the reflector swinging device supports the reflector so as to have the focus of the reflector located on the swinging axis of the reflector swinging device, when the reflector swinging device comprises the reflector supporting arm with the cam follower provided on the imaginary line crossing the swinging axis, and the cam engaged with the cam follower to swing the reflector supporting arm in a certain angular range, and when the electromagnetic radiator is fixed on the swinging axis, the reflector swinging device can be made smaller.

When the vehicular radar further comprises the urging member having an end fixed to a stationary portion and the other end fixed to the reflector supporting arm to press the cam follower against the cam, the reflector can be swung in stable fashion.

When the reflector is a molded product made of a plastic material and having a metallic film provided thereon, the reflector can be made lighter and have small inertia, protecting the reflector swinging device from strain.

When the electromagnetic radiator is an injection-molded product made of a magnesium alloy, the electromagnetic radiator can be manufactured in mass production though it has a complicated shape. The electromagnetic radiator can be manufactured so as to be lightweight and have a stable performance at a low cost. This means that the antenna unit according to the present invention can provide a vehicular radar with a stable performance at a low cost.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Figure 1:
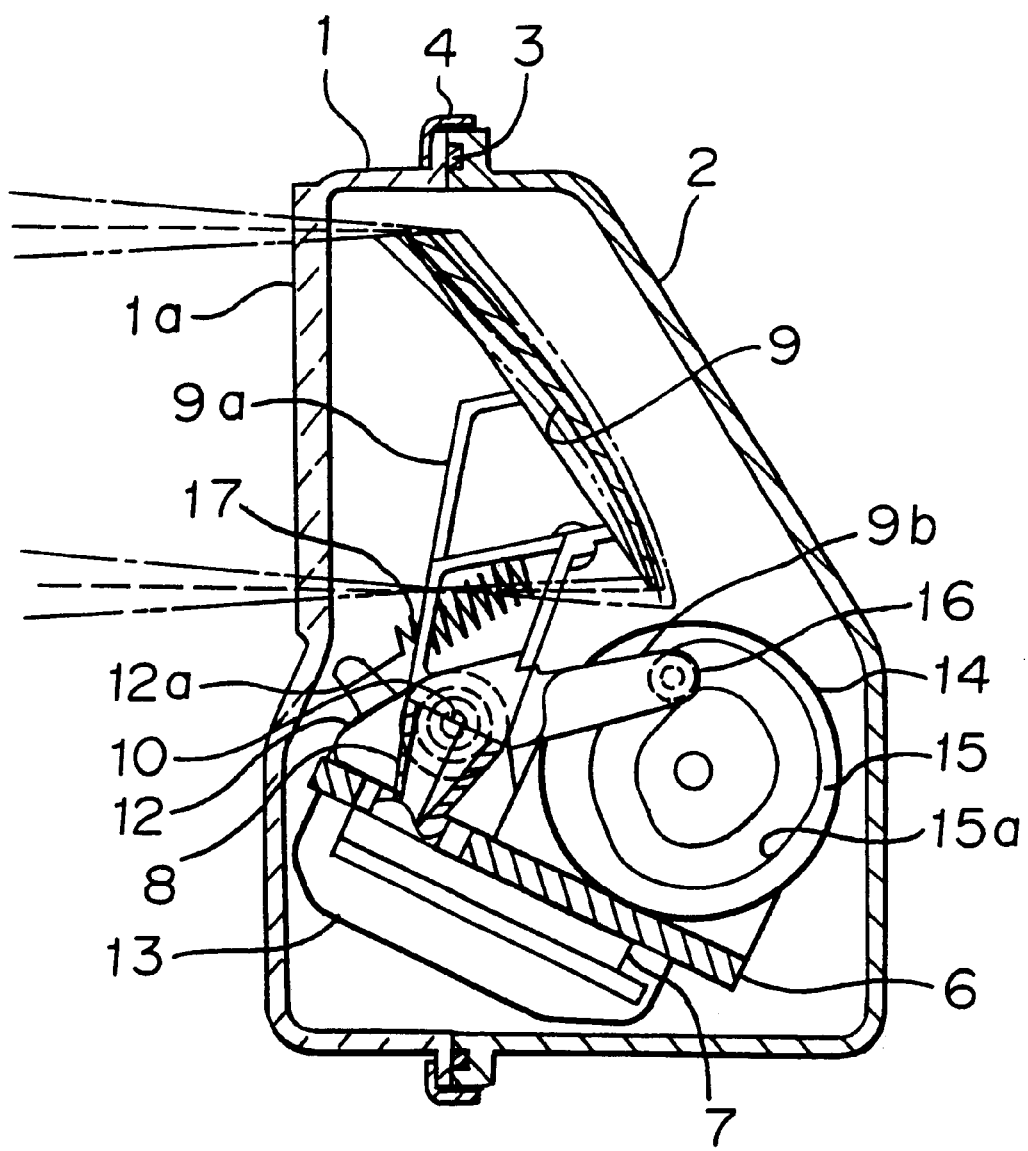
FIG. 1 is a cross-sectional view of the vehicular radar according to an embodiment of the present invention.
Figure 2:
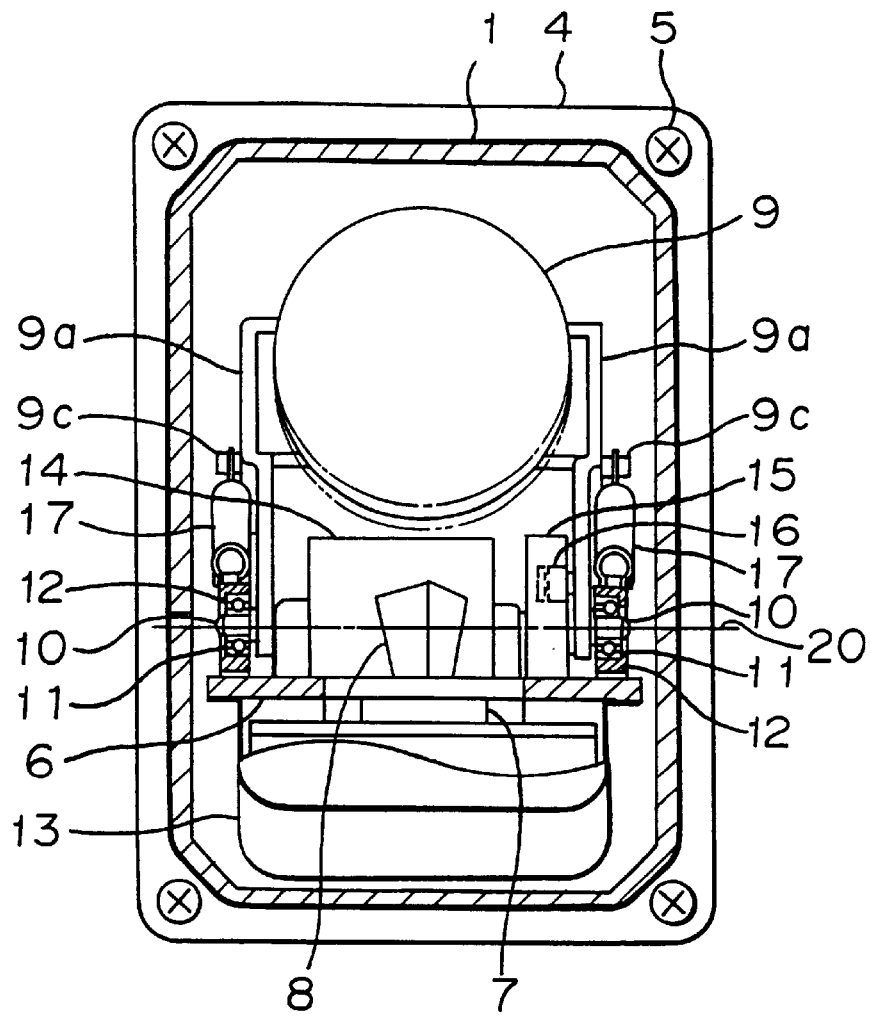
FIG. 2 is a front view of the vehicular radar according to the embodiment.
Figure 3:
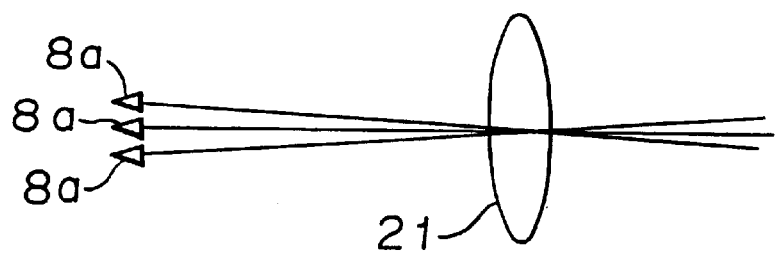
FIG. 3 is a schematic view to explain an antenna unit used in a conventional vehicular radar.

In FIG. 1 is shown a cross-sectional view of the vehicular radar according to an embodiment of the present invention. In FIG. 2 is shown a front view of the vehicular radar according to the embodiment, wherein the inside of the vehicular radar can be seen with a first casing 1 cut away.

In FIGS. 1 and 2, reference numeral 1 designates the first casing, which is made of a plastic material having good electromagnetic wave transmission. Reference numeral 1a designates a transmitting/receiving window, through which a radiant beam can be transmitted and received, and which is integral with the first casing 1. Reference numeral 2 designates a second casing, which is coupled with the first casing. Reference numeral 3 designates packing, which is inserted between mating surfaces of the first casing 1 and the second casing 2 to prevent moisture from entering. Reference numeral 4 designates a reinforcing member, which clamps the packing 3 uniformly. Reference numeral 5 designates screws, which fix the first casing 1 and the second casing 2 through the reinforcing member 4. The first casing 1 and the second casing 2 are fixed to provide an assembly, which houses the vehicular radar comprising respective constituent elements stated below. Reference numeral 6 designates a base, which is fixed to the second casing 2. Reference numeral 7 designates an electromagnetic wave generating module, which is fixed to a side of the base 6. Reference numeral 8 designates an electromagnetic radiator, which radiates a electromagnetic wave from the electromagnetic wave generating module 7 as a beam having certain expansion, and which is an injection-molded product made of a magnesium alloy.

Reference numeral 9 designates a reflector or a reflecting mirror, which reflects the beam radiated from the electromagnetic radiator 8 and radiates the reflected beam with a certain beamwidth. In this embodiment, the reflector is a molded product, which is made of a plastic material and has a metallic film provided thereon, and which is an offset parabolic antenna in a shape obtainable by cutting a part of a paraboloid of revolution.

Reference numeral 9a designates a pair of first arms, which are formed integrally with the reflector 9 to support the reflector 9. Reference numeral 9c designates projections, which are provided on the respective first arms 9a. Reference numeral 9b designates a second arm, which is formed integrally with the reflector 9 and one of the first arms 9a. Reference numeral 10 designates swinging pivots for the reflector 9, which are provided on an axis 20 passing through the focus of the reflector 9. Reference numeral 11 designates bearings for supporting the swinging pivots 10. Reference numeral 12 designates holders for holding the respective bearings 11. The respective holders 12 are fixed to the other side of the base 6 and respective projections 12a provided thereon.

The focus of the reflector 9 means a position that the focus of the reflector occupies when the reflector is located at an intermediate position during swinging movement stated later (at the position indicated by solid lines in FIG. 1). The electromagnetic radiator 8 is fixed to the focal position. The reflector 9 is fixed to the first arms 9a so as to have the focus located on the axis 20.

Reference numeral 13 designates a cover for protecting the electromagnetic wave generating module 7. Reference numeral 14 designates an electric motor, which is fixed to the other side of the base 6. Reference numeral 15 designates a cam, which is fixed to an output shaft of the electric motor 14. The cam 15 has a cam groove 15a formed therein. Reference numeral 16 designates a cam follower. The cam follower 16 is provided at one end of the second arm 9b, and the cam follower tracks the cam grooves 15a in the cam 15 to swing the reflector 9 about the swinging pivots 10. The second arm 9b extends in a direction perpendicular to the axis 20. The cam follower 16 is provided on an imaginary line passing through one of the swinging pivots 10, about which the second arm swings. The axis 20 is a swinging axis of the first arms 9a and the second arm 9b when the reflector 9 is swung.

Reference numeral 17 designates coiled springs (hereinbelow, referred to as the springs). Each of the springs 17 has one end engaged with the projection 9c of a corresponding first arm 9a movable integrally with the reflector 9, and has the other end engaged with the projection 12a of a corresponding holder 12 as a stationary member. Each of the springs works as a member to generate a force to press the cam follower 16 against the cam groove 15a.

In FIG. 2, the cover 13 is shown to have a part thereof cut away.

Now, the operation of the vehicular radar according to the embodiment will be explained.

The electromagnetic wave from the electromagnetic wave generating module 7 is radiated from the electromagnetic radiator 8 toward the reflector 9 with a certain expansion angle. The reflector 9 reflects the beam radiated from the electromagnetic radiator 8 and radiates the reflected beam forward, e.g., a direction in front of the vehicle with a certain beamwidth. When the radiated beam from the reflector 9 irradiates an object to be detected, the object reflects the radiated beam from the reflector 9. The beam reflected by the object returns to the reflector 9, follows the beam radiating paths in the reverse way, and reaches, through the electromagnetic radiator 8, the electromagnetic wave generating module 7, where a received signal is obtained. In accordance with a relationship between transmitted electromagnetic waves and received electromagnetic waves in such a process, the distance between the object and the vehicle with the vehicular radar carried thereon, and the relative velocities speed of the object with respect to the vehicle can be calculated based on frequency differences, with a Doppler shift included, between the transmitted electromagnetic wave and the received electromagnetic wave at each of times when the frequency increases and when the frequency decreases, in the case of an FMCW radar, for instance.

In accordance with the movement of the cam follower 16, which traces the cam groove 15a in the cam 15 driven by the electric motor 14, the reflector 9 carries out the swinging movement about the swinging pivots 9 through the first arms 9a and the second arm 9b formed integrally with the reflector 9 as indicated by a solid line, a chain line and a chain-dotted line in FIG. 2. In accordance with the swinging movement of the reflector 9, the radiated beam from the electromagnetic radiator 8 provided at the focal position of the reflector 9 is reflected by the reflector 9 and is radiated with the certain beamwidth toward directions indicated by the broken lines, chain lines and chain-dotted lines in FIG. 1 in succession. The radiated beams, which have been radiated in the directions indicated by the broken lines, the chain lines and the chain-dotted lines in accordance with the swinging movement of the reflector 9, hit on the object and are reflected by the object. The beams reflected from the respective directions are received by the reflector 9 and consequently the electromagnetic radiator 8.

The direction of the object can be calculated based on the receiving intensities of the received beams from the plural directions.

Thus, the distance between the object in front and the vehicle with the vehicular radar carried thereon, the relative velocities speed of the object and the direction of the object can be found.

The electromagnetic wave generating module 7 is one that includes a transmitter for outputting a transmitting electromagnetic wave, a receiver for detecting a electromagnetic wave received by an antenna unit, and a signal processor for processing an output signal from the receiver to output information about the object.

The reflector 9 can carry out the swinging movement in stable fashion since the cam follower 16 correctly trances the cam groove 15a in the cam 15 driven by the electric motor 14. Each of the springs 17 is provided between the projection 12a on each of the holders 12 and the projection 9c on each of the first arms 9a provided integrally with the reflector 9, thus exerting a force to press the cam follower 16 against the cam groove 15a. In the embodiment, movable parts including the parabolic reflector 9 are manufactured as molded products made of a plastic resin material to decrease the weight, minimizing an inertia force.

The electromagnetic radiator 8 may be an injection-molded product made of a magnesium alloy to have a light weight and a stable performance with good dimensional accuracy. Thus, the electromagnetic radiator 8 can improve productivity though it has a complicated shape.

Obviously, numerous modifications and variations of the present invention are possible in light of the above teachings. It is therefore to be understood that within the scope of the appended claims, the invention may be practiced otherwise than as specifically described herein.

What is claimed is:

1. A vehicular radar comprising:
    a transmitter for outputting a transmitted electromagnetic wave;
    an antenna unit for radiating the transmitted electromagnetic wave and receiving an electromagnetic wave reflected by an object to be detected as a received electromagnetic wave;
    a receiver for detecting the reflected electromagnetic wave received by the antenna unit; and
    a signal processor for processing an output signal from the receiver to output information about the object;
    wherein the antenna unit comprises a single electromagnetic radiator for radiating the transmitted electromagnetic wave, a single reflector for reflecting the transmitted electromagnetic wave from the electromagnetic radiator and radiating the transmitted electromagnetic wave as a beam, and a reflector swinging device for oscillating the reflector so as to successively change a direction of the beam,
    wherein the reflector swinging device supports the reflector so as to have a focus of the reflector located on a swinging axis of the reflector swinging device; the reflector swinging device comprises a reflector supporting arm with a cam follower provided on an imaginary line crossing the swinging axis, and a cam engaged with the cam follower to swing the reflector supporting arm in a certain angular range; and the electromagnetic radiator is fixed on the swinging axis.

2. The vehicular radar according to claim 1, wherein the electromagnetic radiator is fixed at a certain location and the reflector swinging device swings the reflector so as to have a focus of the reflector located at the certain location.

3. The vehicular radar according to claim 1, further comprising an urging member having an end fixed to a stationary portion and the other end fixed to the reflector supporting arm to press the cam follower against the cam.

4. The vehicular radar according to claim 3, wherein the urging member comprises a coiled spring.

5. A vehicular radar comprising:
    a transmitter for outputting a transmitted electromagnetic wave;
    an antenna unit for radiating the transmitted electromagnetic wave and receiving an electromagnetic wave reflected by an object to be detected as a received electromagnetic wave;
    a receiver for detecting the reflected electromagnetic wave received by the antenna unit; and
    a signal processor for processing an output signal from the receiver to output information about the object;
    wherein the antenna unit comprises a single electromagnetic radiator for radiating the transmitted electromagnetic wave, a single reflector for reflecting the transmitted electromagnetic wave from the electromagnetic radiator and radiating the transmitted electromagnetic wave as a beam, and a reflector swinging device for oscillating the reflector so as to successively change a direction of the beam,
    wherein the reflector is a molded product made of a plastic material and having a metallic film provided thereon.

6. A vehicular radar comprising:
    a transmitter for outputting a transmitted electromagnetic wave;
    an antenna unit for radiating the transmitted electromagnetic wave and receiving an electromagnetic wave reflected by an object to be detected as a received electromagnetic wave;
    a receiver for detecting the reflected electromagnetic wave received by the antenna unit; and
    a signal processor for processing an output signal from the receiver to output information about the object;
    wherein the antenna unit comprises a single electromagnetic radiator for radiating the transmitted electromagnetic wave, a single reflector for reflecting the transmitted electromagnetic wave from the electromagnetic radiator and radiating the transmitted electromagnetic wave as a beam, and a reflector swinging device for oscillating the reflector so as to successively change a direction of the beam,
    wherein the electromagnetic radiator is an injection-molded product made of a magnesium alloy.

* * * * *